(12) United States Patent
Olkkonen et al.

(10) Patent No.: US 6,738,374 B1
(45) Date of Patent: May 18, 2004

(54) SPEECH TRANSMISSION IN A PACKET NETWORK

(75) Inventors: Mikko Olkkonen, Helsinki (FI); Mauri Tikka, Helsinki (FI); Kristian Rauhala, Espoo (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/155,426

(22) PCT Filed: Mar. 27, 1997

(86) PCT No.: PCT/FI97/00194

§ 371 (c)(1),
(2), (4) Date: Apr. 30, 1999

(87) PCT Pub. No.: WO97/37466

PCT Pub. Date: Oct. 9, 1997

(30) Foreign Application Priority Data

Mar. 29, 1996 (FI) .................................................. 961442

(51) Int. Cl.[7] .............................. H04L 12/56; H04J 3/24
(52) U.S. Cl. ..................................... 370/389; 370/395.1
(58) Field of Search ............................. 370/389, 395.1, 370/465, 470, 474, 476

(56) References Cited

U.S. PATENT DOCUMENTS

| | | | | |
|---|---|---|---|---|
| 4,703,477 A | * | 10/1987 | Adelmann et al. | 370/94 |
| 4,726,019 A | * | 2/1988 | Adelmann et al. | 370/94 |
| 5,130,985 A | * | 7/1992 | Kondo et al. | 370/94.1 |
| 5,136,584 A | * | 8/1992 | Hedlund | 370/94.1 |
| 5,247,516 A | * | 9/1993 | Bernstein et al. | 370/82 |
| 5,282,207 A | * | 1/1994 | Jurkevich et al. | 370/110.1 |
| 5,305,308 A | | 4/1994 | English et al. | |
| 5,414,702 A | * | 5/1995 | Kudoh | 370/60 |
| 5,600,754 A | * | 2/1997 | Garner et al. | 395/2.3 |
| 5,692,105 A | * | 11/1997 | Leppanen et al. | 395/2.94 |

FOREIGN PATENT DOCUMENTS

| | | |
|---|---|---|
| EP | 662 778 | 7/1995 |
| EP | 664 658 | 7/1995 |
| EP | 691 769 | 1/1996 |
| FR | 660 625 | 6/1995 |
| WO | 93/00778 | 1/1993 |
| WO | 94/30028 | 12/1994 |
| WO | 95/14337 | 5/1995 |
| WO | 95/34977 | 12/1995 |
| WO | 96/34478 | 10/1996 |
| WO | 96/42176 | 12/1996 |

* cited by examiner

*Primary Examiner*—Steven Nguyen
*Assistant Examiner*—Toan D. Nguyen
(74) *Attorney, Agent, or Firm*—Pillsbury Winthrop LLP (57) ABSTRACT

Speech is transmitted between a base station (BTS) and a TRAU by converting a speech signal into a parameter group which is inserted in a traffic frame which is transmitted as a packet comprising a header and a payload. In accordance with the invention, the payload is formed of the contents of several traffic frames until the payload is essentially full, and a packet is sent to the destination via the transmission network. At the destination the traffic frames are separated from the payload of the received packets and they are passed to a speech decoder. The packing of packets full can be started about a second after the beginning of the connection and after pauses, in which case the ending of a pause is transmitted to the listener as fast as possible.

15 Claims, 4 Drawing Sheets

SPEECH TRANSMISSION IN A PACKET NETWORK

This application also claims the national phase of international application PCT/FI97/00194 filed Mar. 27, 1997 which designated the U.S.

FIELD OF THE INVENTION

The invention relates to speech transmission in a packet network and especially to transmission between a transcoder and a base station of a digital mobile communication network.

The invention will be explained in connection with speech processing and speech frames but the same technique can be applied to transmission of a music and video signal. It is common to these signals that signal samples have to be conducted isochronously to a decoder, that is, essentially at intervals equal to the intervals at which the samples are formed in the encoder.

BACKGROUND ART

In a digital telephone system a speech signal is encoded in some manner before it is channel coded and sent to the radio path. For example, in the case of the GSM system, digitalized speech is processed frame by frame at intervals of about 20 ms by using different methods so that it results in a parameter group representing speech for each frame. This information, that is, the parameter group is channel coded and sent to the transmission path. The used speech coding algorithms are RPE-LTP (Regular Pulse Excitation LPC with Long Term Prediction) and various code excited algorithms CELP (Code Excited Linear Prediction) of which VSELP (Vector-Sum Excited Linear Prediction) should be mentioned.

In addition to actual coding, the following functions are also built in for speech processing: a) on the transmitter side Voice Activity Detection VAD with which the transmitter can be instructed to be switched on only when there is speech to be sent (Discontinuous Transmission, DTX), b) on the transmitter side the evaluation of background noise and the generation of respective noise parameters and on the reception side the generation of comfort noise in a decoder from the parameters, and c) acoustic echo suppression. Noise during a break makes the connection sound more pleasant than absolute silence.

In a known GSM mobile telephone system the input of a speech encoder is either a PCM signal of 13 bits from the network or an A/D converted PCM of 13 bits from the audio part of the mobile station. The speech frame obtained from the output of the encoder is 20 ms in duration and comprises 260 audio bits which are formed by encoding 160 PCM-encoded speech samples. Voice Activity Detection (VAD) defines from the parameters in the speech frame whether or not the frame contains speech. If speech is detected, the frames transmitted to the radio path as so-called traffic frames are speech frames. After a speech burst, and at specified intervals also during speech pauses indicated by the VAD, the traffic frames are SID frames (Silence Descriptor) containing noise parameters, in which case the receiver is able to generate from these parameters noise similar to the original noise also during pauses.

A traffic frame thus contains a speech block of 260 bits representing 20 ms of encoded speech/data or noise. Furthermore, the frame has 56 bits available for frame synchronization, speech and data indication, timing and other information, the total length of the traffic frame being 316 bits. Uplink and downlink traffic frames differ slightly from one another in these 56 bits.

Figure 1:
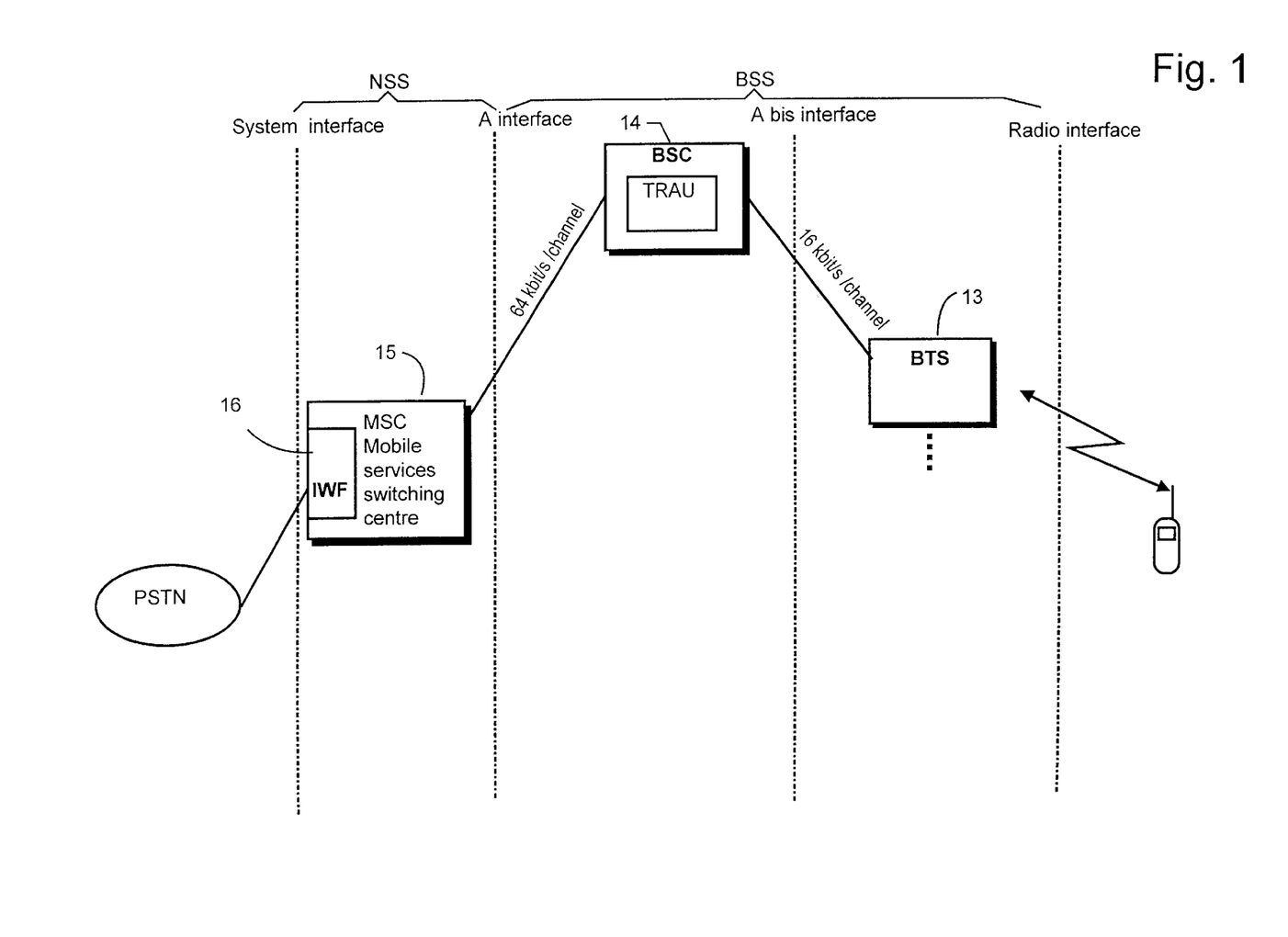
FIG. 1 shows a simplified view of the mobile communication network.

Referring to FIG. 1, which shows a simplified view of the present GSM network from the point of view of transmission. Network Subsystem comprises a mobile service switching centre, the mobile communication network being connected via the system interface of the mobile services switching centre to other networks, such as Public Switched Telephone Network PSTN. Via A interface the network subsystem is connected to the base station subsystem BSS comprising base station controllers BSC and base stations BTS connected thereto. The interface between the base station controller and the base stations connected thereto is an Abis interface. The base stations are in radio communication with mobile stations via the radio interface. Traffic frame forming unit TRAU explained above is in the figure placed in association with the base station but it may also be situated in association with the mobile services switching centre.

Figure 2:
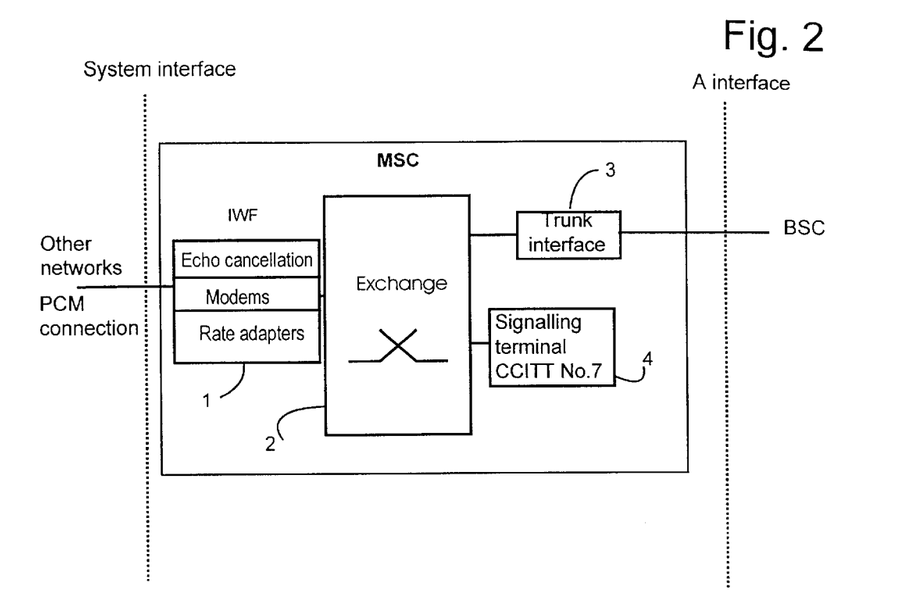
FIG. 2 shows the functional parts of a mobile services switching centre.

The mobile services switching centre MSC is shown in a simplified way in FIG. 2. Control of the base station system BSS is one function of the mobile services switching centre in addition to a call control. The function of the switching matrix is to select, switch and separate speech/data and signalling paths passing through it in a desired way. The switching matrix switches in this way its part of the connection between a mobile subscriber and a subscriber of another network or of the connection between two mobile subscribers. The function of the Network Interworking Functions IWF 1 is to adapt the GSM network into other networks. The PCM trunk line is connected to a PBX system by a terminal circuit trunk interface 3 so that the physical interface of layer 1 between the exchange and the base station controller BSC is a line of 2 Mbit/s, that is, 32 time slots of 64 kbit/s (=2048 kbit/s). The signalling terminal 4 carries out signalling according recommendation CCITT No:7.

The functions of the base station controller BSC indicated with reference 14 in FIG. 1 include selection of a channel between it and the mobile station, link control and channel release. It carries out mapping from the radio channel to the channel of the PCM time slot of the interconnecting line between the base station and the base station controller. The base station controller shown in a simplified way in FIG. 3 comprises terminal circuits, trunk interfaces 31 and 32 by means of which the base station controller is connected on the one hand to the mobile services switching centre over the A interface and on the other hand to the base stations over the Abis interface. Transcoder and Rate Adaptation Unit TRAU is an element of the base station system BSS and it may be situated in association with the base station controller BSC as shown in FIG. 1, or also in association with the mobile services switching centre, for example. The transcoders convert speech from one digital format to another, for example, they convert the 64 kbit/s A-law PCM from the exchange over the A interface into encoded speech of 13 kbits to be sent to the base station line and vice versa. Rate adaptation for data is carried out between the rate 64 kbits and the rates 3.6, 6 or 12 kbit/s.

The base station controller BSC configures, allocates and supervises the circuits of 64 kbit/s in the direction of the base station. It also controls the switching circuits of the base station by means of the PCM signalling link and allows the circuits of 64 kbit/s to be used efficiently, that is, a switch at the base station, which the base station controller controls, switches transmitter/receivers to PCM links. This switch hence operates as a drop/insert multiplexer, i.e. as an add/ drop multiplexer which drops a PCM time slot for the transmitter of the data or inserts a reception time slot to a PCM time slot of the data or links the PCM time slots forwards to other base stations. The base station controller thus sets up and releases connections to the mobile station. The connections from the base stations to the PCM line or lines over the A interface and the procedure in the opposite way are multiplexed in a switching matrix 33.

The physical interface of layer 1 between the base station BTS and the base station controller BSC is a line of 2 Mbit/s, that is, 32 time slots of 64 kbit/s (=2048 kbit/s). The base station is totally controlled by the base station controller BSC and it mainly contains transmitter/receivers TRX which implement the radio interface towards the mobile station. Four full rate traffic channels via the radio interface can be multiplexed into one PCM channel of 64 kbit/s between the base station controller and the base station, in which case the rate of the speech/data channel is in this interval 16 kbit/s. In that case, one PCM link of 64 kbit/s can transmit four speech/data connections.

FIG. 1 illustrates the transmission rates per channel used in the GSM. The mobile station sends speech or data information over the radio interface on the radio channel as traffic frames. A base station 13 receives the information and transmits it to the time slot of 64 kbits of the PCM line. The other three traffic channels of the same carrier wave are also inserted in the same time slot, that is, the channel, so that the transmission rate for a connection is 16 kbit/s. In a base station controller 14 the transcoder/rate adaptation unit TRAU converts the rate 16 kbit/s of the encoded digital information into the rate 64 kbit/s and at this rate the data is transmitted to the mobile services switching centre after which, subsequent to possibly necessary modulation and rate modification, the information is transmitted to some other network.

In accordance with the foregoing explanation, the base station controller selects the circuits with which a connection is set up between it and No the transmitter/receivers of the base station. The radio channel (TDMA time slot) and the PCM time slot of the line between the base station and the base station controller has during the connection a one-to-one correspondence, that is, in the uplink direction the information of a specified time slot of a specified carrier wave is always inserted in the same PCM channel of 16 kbit/s and correspondingly, in the downlink direction the information of this PCM channel is always transmitted to the same TDMA time slot. The base station controller signals to the base station which base station of the TDMA time slot has to be bound to which PCM channel. In that way the base station controller alone allocates the channel through the Abis interface and radio interface as far as the mobile station. When the base station has allocated a channel as far as the mobile station, a mobile services switching centre 15 selects the circuits with which the connection between the mobile services switching centre and the base station controller/TRAU are generated, that is, the circuits towards the A interface of the exchange and the base station controller. At the end the generated links are connected to each other.

Data transmission standard ATM (Asynchronous Transfer Mode) has been introduced for combinations of narrow band and broad band implementations and for transmission of packets and signalling. ATM is a connection-oriented packet switching technique which the international telecommunication standardization organization ITU-T has chosen as an implementation technique of Broadband Integrated Services Digital Network (B-ISDN). In the ATM, data is packed in frames which comprise several packets of a constant length known as cells. The length of a cell is 53 bytes and a cell comprises a header of 5 bytes in length and 48 bytes have been reserved for a payload. When ATM cells are sent, each cell can be directed to different destinations on the basis of its header.

ATM technique is best suited for use in broadband networks, especially in transmission networks using fibre optics. It is therefore probable that in the mobile communication network the present PCM technique using trunk lines of 2 Mbit/s, which the mobile operator has often hired from another F teleoperator, will be replaced with ATM technique. It is necessary to operate in this way especially if the transmission capacity of the radio path is increased so much that the present PCM connection is no longer sufficient. In that case the data transmission capacity and the rate of the mobile communication network would increase considerably. It is also possible that the premises where a new base station is positioned already have an existing ATM connection, in which case it would be tempting to use it.

Speech transmission in ATM cells has become a problem. In present circuit-switched connections, speech transmission is very fast and delays hardly ever cause problems. Instead, it has become a problem how to manage transmission delays when various audio signals to the network from any of the several input points are transmitted by the ATM technique to any of the numerous output points of the network. It is a particular problem how to transmit audio signals converted into PCM encoded signals and multiplexed in PCM devices between the nodes of the network and across the network, which network contains ATM transfer devices and exchanges.

The solutions given to this problem are at least the following a) use of microcells, b) incomplete filling of cells, and c) emulation of circuit switching. When micro cells are used, several speech channels are multiplexed for transporting one ATM cell. It is a problem with the micro cell technique that an ATM cell is no longer the basic unit of switching, in which case ordinary ATM switching devices cannot be used to switch speech channels but special arrangements and devices are needed for releasing speech channels inside the microcells. In incomplete filling of ATM cells, the payload of the cell is left incomplete. In this way the capacity is underused, but it has to be done if delays are to be avoided. In emulation of circuit switching, information moving on the PCM line of 2 Mbit/s is transmitted transparently in one ATM cell flux. A disadvantage of this method is that transmission capacity is always reserved regardless of whether or not there are calls to be transmitted, wherefore the transmission of empty cells cannot be avoided. Another disadvantage is that speech channels of the connection of the point-to-point nature cannot be connected with ATM devices inside the network into different directions.

Patent Application WO 94/11975 discloses a method, a telecommunication network and a switching system for transmitting several PCM encoded speech channels through the ATM network. The method includes features of steps a and c mentioned above. According to the application, several speech channels assigned to the same output node of the ATM network are packed in one ATM cell, whereby sound and narrowband data channels are transmitted in these cells which are transmitted at a reproducing rate which is the same or an integral part of the reproducing rate of a sound-containing PCM signal. Cells are transmitted in the network between the input node and the output node via virtual circuits maintaining a constant rate. When there are no great changes in the traffic so that permanent virtual paths need to be added or deleted between two nodes, the switching system carries out a simple operation: a frame of PCM samples at the input point of 125 microseconds in duration, inserted in one ATM cell is routed through the network to the output node, which means that cells are sent at intervals of 125 milliseconds. One PCM sample comprises one byte, wherefore 48 speech channels at the maximum can be transmitted in one cell. If the capacity of the PCM channel is more than 64 kbit/s, e.g. 384 kbit/s, more bytes are used of the cell for one channel, for example 6 bytes.

None of the above explained methods is as such suitable when the transmission of audio information of the PCM channel between the base station and TRAU is replaced with the ATM connection in order that speech information can be transmitted, when required, directly from one base station to another without the connection passing through the TRAU or the mobile services switching centre as in the prior art GSM system.

A full-rate speech frame in the GSM system is 316 bits. This is about 85% of the length of the payload of an ATM cell (47 to 48 bytes or 376 to 384 bytes). It is conceivable that one speech frame is packed into one ATM cell, in which case about 15% of the maximum bandwidth would be lost. Efficiency is, however, considerably worse when half-rate speech frames, for example, are packed into the ATM cell. The method cannot be used at all if the length of the speech frame exceeds the length of the cell payload in the packet network.

Another possible packet network to which the method of the invention could be applied is Internet. The length of an Internet packet is variable, but from the point of view of bandwidth, it is not efficient to send each traffic frame as an individual packet.

SUMMARY OF THE INVENTION

The object of the present invention is thus to develop a method by means of which speech comprising speech frames generated from a PCM encoded speech signal of the speech encoder can be transmitted in a packet network, such as the ATM or Internet network, without a disadvantageous delay and by utilizing bandwidth as well as possible and so that in case of a speech signal, voice quality will remain as good as possible. Another object is that the method can also be employed for transmitting music and video samples. A further object of the invention is develop a method by means of which a speech/audio/video signal of good quality can be transmitted efficiently in packet mode between a base station and a TRAU or two base stations in the mobile communication system.

The object is attained with the method that is characterized by what is stated in claim 1. The dependent claims are directed to the preferred embodiments of the invention.

The invention is based on the idea that the payload of the frames in the packet network is filled as full as possible, in which case some of the speech frames have to be divided into two consecutive frames of the packet network.

A digitalized speech signal is converted frame by frame in a speech encoder into a parameter group which is inserted in a traffic frame. A traffic frame may be a speech frame as such but mostly additional bits are needed for different purposes for the transmission, in which case the length of the frame is greater than the length of a mere speech frame.

The provided traffic frames are inserted immediately in the payload part of the data packet so that the payload parts of the packets are filled completely. A traffic frame, which does not fit into the payload part of the preceding packet, is divided between two distinct packets. The packets are sent via the transmission network to the destination. At the destination the parts of the traffic frame are separated from the payload of the received packet, the parts being assembled into whole traffic frames. The speech frames contained in the traffic frames are passed to a speech decoder for producing the original digitalized speech signal.

The method as such would lead to deterioration of speech quality as some speech frames are sent immediately and some are sent only with a part of the following speech frame. According to the preferred embodiment of the invention, speech quality is improved by buffering speech frames in the memory of the receiver so that the received speech frames are passed to the speech decoder at intervals equal to the intervals in which they were originally formed.

The advantages of the invention are first of all a reduced transmission delay in the network and secondly, the transmission of one call in one packet of the packet network enables packet switching of cells and thus directing the call to the desired destination. This results in a telephone network that utilizes packet network technique efficiently.

Furthermore, the transmission of the call in one packet of the packet network makes it possible that after the call has been terminated, the transmission of the cells also ends, which is contrary to when circuit switching is emulated. The cells need not to be sent during pauses in speech but only when noise parameters are transmitted. Transmission capacity is thus released during pauses for other use, such as for other simultaneous connections, which is contrary to a circuit-switched network where pauses in the connection cannot be utilized with other connections.

As frames associated with one speech signal are inserted in one packet network packet, all the frames in the same packet are transmitted to the same destination, in which case releasing and rerouting of the packets will be avoided at the destination. The use of the method of the invention can be restricted only to audio/video connections, whereby the packets can be sent in a data transmission immediately, without delays.

In place of a speech signal, another audio or video signal may be transmitted, in which case instead of a speech frame, it could be generally called a parameter group. According to the preferred embodiment, the transmission network is an ATM or Internet network, in which case the packet is an ATM cell or an Internet packet.

BRIEF DESCRIPTION OF THE DRAWINGS

The invention will be now explained in more detail in association with preferred embodiments with reference to the appended drawings, where.

DETAILED DESCRIPTION OF PREFERRED EMBODIMENTS

The PCM connection between TRAU and base stations described in FIG. 1 is replaced with an ATM connection.

Because the TRAU can be physically situated in association with a base station controller or a mobile services switching centre, it means in practice that all the PCM connections of the present mobile services switching centre can be replaced with ATM connections.

Figure 3:
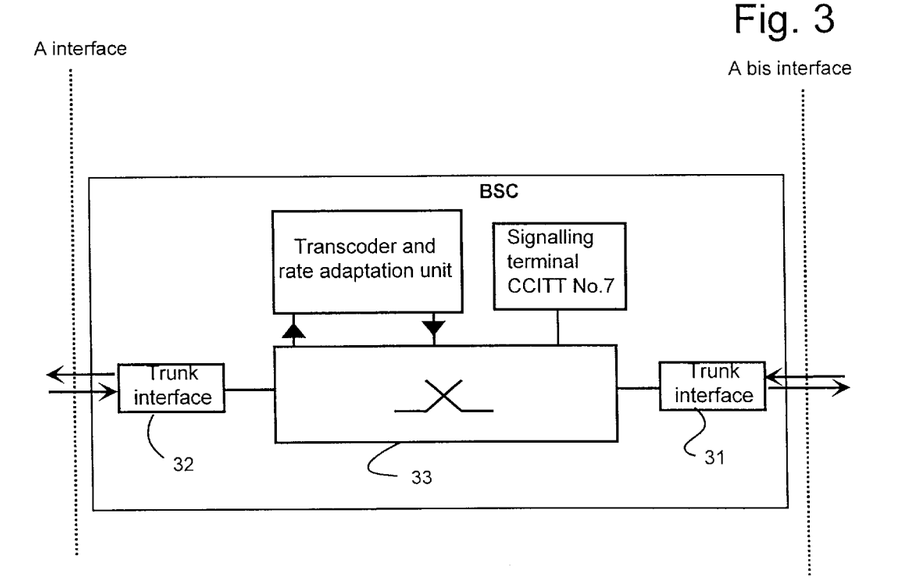
FIG. 3 shows the functional parts of a base station controller.

In the following example it is assumed that the TRAU is located in association with a base station controller as disclosed in FIG. 3 but it should be noted that the physical location of the TRAU is not essential for the invention.

Figure 4:
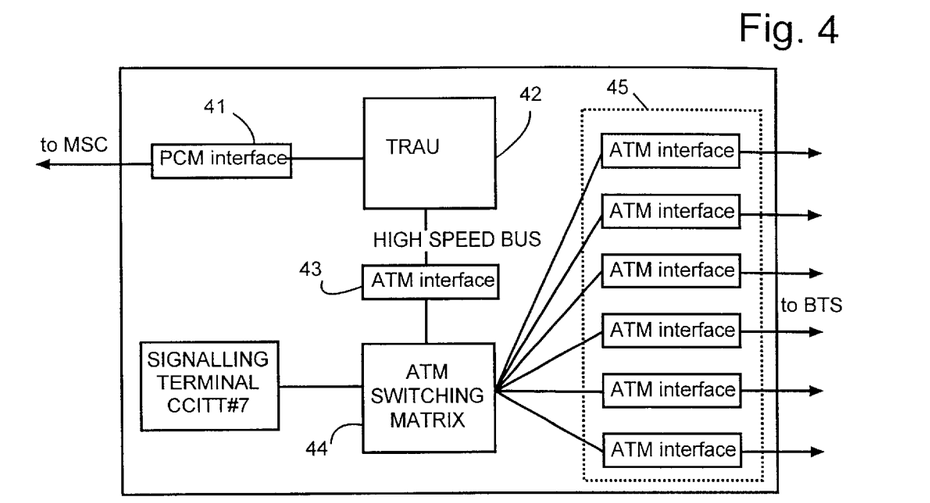
FIG. 4 shows a base station controller having arrangements according to the invention.

With reference to FIG. 4, the method of the invention is explained from the point of view of the TRAU. When PCM encoded speech is received from the direction of the mobile services switching centre on the speech channel assigned to the TRAU, it is directed via a PCM interface block 41 to the TRAU 42 which forms of the incoming PCM audio signals traffic frames of 316 bits exactly as in the system of the prior art. When the first traffic frame has been formed, it is directed via a high-speed bus to an ATM adaptor 43 which inserts the frame in the payload part of the ATM cell. As this part is of a constant length, 47 or 48 bytes (376 or 384 bits), the first traffic frame will not fill the first ATM completely but the cell is sent only when its payload part has been filled with the initial part of another traffic frame. The adaptor 43 inserts the necessary address information in the headers of the cell so that a following ATM switching matrix 44 is able to direct the cell to the appropriate ATM interface card of an ATM interface group 45 at the output side and thus to the correct physical connection and to the destined base station.

If there is only one outgoing physical downlink connection towards the ATM network, no switching matrix would be needed at all and only one ATM card 45 would be required.

The transmission of a cell to the base station is very fast. Nowadays when a traffic frame is transmitted two bits at a time in time slots of the PCM line of 2 Mbit/s at a rate of 16 kbit/s, the transmission of a frame between the TRAU and the base station takes about 20 ms. When using the same physical line but the ATM protocol, the transmission takes only about 0.2 ms.

When receiving traffic frames inserted in ATM cells and sent by the base stations, the mode of operation is evident from the foregoing. ATM cells are received from different physical lines and the switching matrix 44 switches the cells belonging to the same channel on the basis of the address in the successive order to the ATM adapter 43 that separates from each cell the payload, that is, the traffic frame sent by the mobile station and reassembled by the base station. The transcoder of the TRAU 42 starts to decode the traffic frame immediately after having received the traffic frame as a whole from the high speed bus. The speech signal decoded into A-law standard mode is directed to the PCM interface block 41 which inserts the speech signal in the PCM time slot assigned to the connection to be transported further to the mobile services switching centre MSC.

The transporting distance is not long in case the TRAU is placed in association with the MSC and not in association with the base station controller as in FIG. 4. If all the trunk lines as well as the connections from the mobile services switching centre to the other networks are replaced with ATM connections and the exchange is realized by ATM technique, in the TRAU the PCM-mode speech can be inserted directly in the ATM cell and transmitted further.

Figure 5:
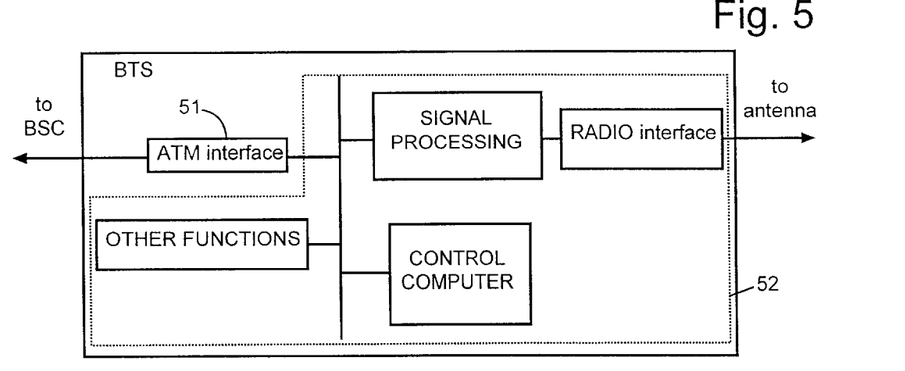
FIG. 5 shows the base station with the operation of the invention added.

In the following, events are examined with reference to FIG. 5 at the other end of the connection, that is, at the base station. In the figure the blocks inside reference numeral 52 are blocks of a base station known per se and not as such essential for the invention and thus not necessary to be explained in this connection.

Various known operations are performed for the traffic frame formed by the mobile station before sending, as a result of which it is sent scrambled and in small pieces over the radio path to the base station. The base station BTS receives the pieces over the radio interface and assembles the original traffic frame of them. As soon as it has assembled the frame, the frame is directed to the ATM interface block 51 which inserts the frame in the payload of the ATM cell, sets the required header information and sends the cell towards the TRAU. The transcoder starts to decode the frame sent in the cell as soon as it has been received in full. In order that the delay would be as small as possible, the connection between the ATM interface block 51 and the block (signal processing) assembling the traffic frame at the base station has to be very fast.

Figure 6:
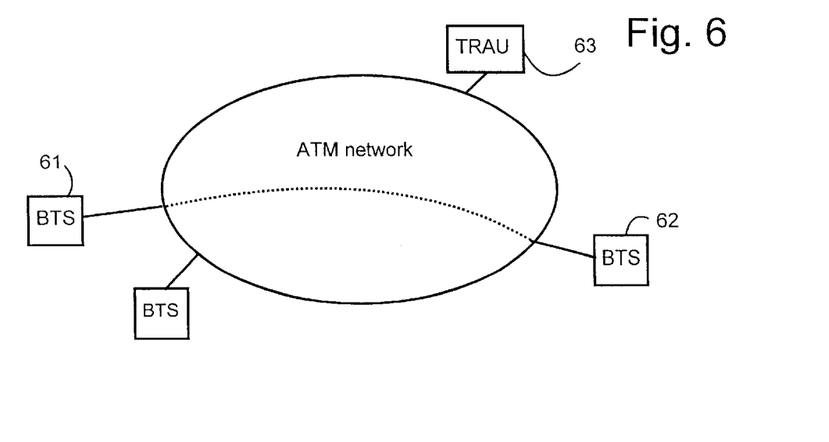
FIG. 6 shows a preferred transmission path between two base stations.

The transmission of speech information via the ATM network according to the method enables the generation of a direct speech connection between two base stations. Reference is made to FIG. 6. In conventional networks a speech connection between two mobile stations passes via the TRAU and the mobile services switching centre. In the method of the invention, the connection between base stations, e.g. BTS 61 and BTS 62 can be implemented directly by placing the header of the receiving base station as the address of the ATM cell which contain the traffic frame, in which case the connection need not pass via the TRAU 63. The mobile communication network has naturally informed the base stations in advance by means of signalling connections where the packets are to be sent and which calls the packets are associated with. This possibility will relieve the loading the network and accelerate the connection and improve speech quality as successive modifications of encoded speech—PCM speech—encoded speech need not be carried out.

Figure 7:
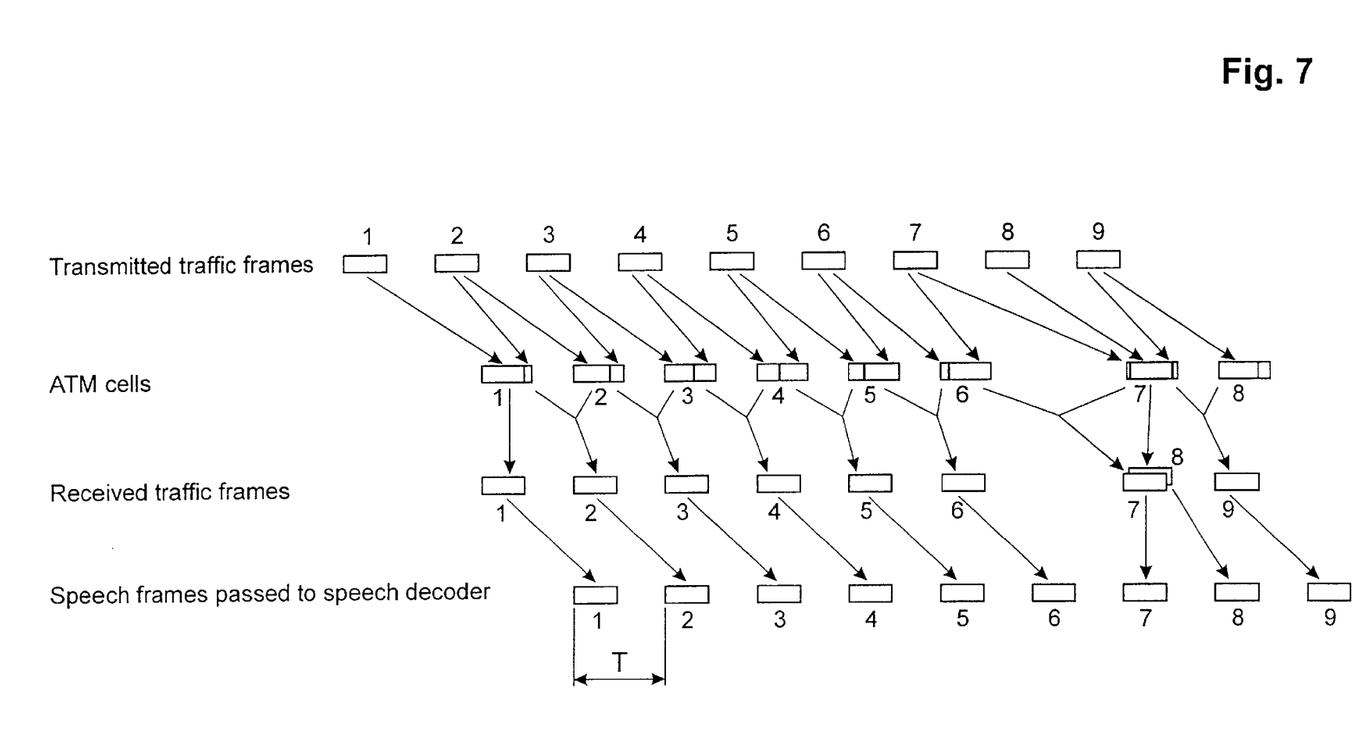
FIG. 7 shows assembling the traffic frames into packets and dissembling packets into traffic frames.

According to the preferred embodiment of the invention, variable delays generated inevitably in the packet network will be compensated. When the ATM network is used for transmitting speech information, delay variation causes problems. FIG. 7 illustrates transmission of packets. The first ATM cell can be sent only when traffic slots 1 and 2 have been received. After this, ATM cells 2 to 6 can be sent after each received traffic frame. Instead, ATM cell 7 can be sent only when traffic frame 9 has been received, which causes a break of one traffic frame in length after ATM cells 6 and 7. The generation of breaks at intervals of about six ATM cells is caused by an about one-sixth difference between a traffic frame and an ATM cell.

The transmission of packets in the ATM network will lose synchronization between them for two separate reasons. The first reason is a small random variation of transmission times of a packet, which is characteristic for the packet network. The second reason is that specific traffic frames sent at regular intervals do not induce the ATM cell to be sent. In order to maintain the quality of reconstructed speech, synchronization must be restored before the speech frames are passed to the speech decoder. This may be carried out by buffering the received traffic frames in the memory and by passing them to the speech decoder at regular intervals. The amount of memory used as a buffer can be diminished by isolating 260 bit speech frames from 316 bit traffic frames, the speech frames being stored in the memory. The speech frames are conveyed to the speech decoder so that the interval between them corresponds to the sampling interval at which the transmitter has formed the speech frames. In the case of the exemplified GSM system, this interval is 20 ms.

The conveying of frames to the speech decoder may be synchronized with the ATM cells to be received, for example, by measuring the time passed between conveying one frame to the speech decoder and receiving the following ATM cell. If the ATM cell is received sooner than expected, the interval between two consecutive speech frames conveyed to the speech decoder will be slightly diminished and vice versa. When the forming of a traffic frame in the transmission end does not lead to sending the ATM cell, this adjustment does not take place, but the last used interval or a nominal interval is used. If said connection is identified (e.g. by the header part of the traffic frame) as a data connection, buffering and synchronization restoration are not necessary.

In a packet network—at least at lower qualities of service—it is possible that the speech frame conveyed by the ATM cell is received so late that all the data in the buffer has already been conducted to the speech decoder. In this case it is possible to apply the method of bad speech frame replacement used in the GSM system, for example. Alternatively, the initial part of the last received speech frame may be decoded again until the following speech frame has been received to be passed to the speech decoder. The time in which replacing information has been conveyed to the speech decoder delays speech reconstruction and this time acts as a buffer zone against the following ATM cell being too late as well. A maximum value can be set for delay which, if exceeded, will cause the following speech frame to be destroyed completely or partially, in which case delay will not be able to accumulate inconsiderably.

According to one preferred embodiment of the invention, at the beginning of the connection and after pauses, a small number of packets is sent immediately after traffic frames have been formed. For example in the GSM system, pauses can be identified by SID frames (Silence Descriptor). This will result in that the starting of speech after a pause will be transmitted to the receiver as fast as possible. This diminishes the risk that both parties of the call would start talking at the same time. When the normal procedure of the invention is resumed, that is, the payload parts of the packets are packed full, the receiver sees the event as the absence of one speech frame. In this case it is also possible to apply the method of bad speech frame replacement used in the GSM system. It is known from experience that an absence of one speech frame cannot be detected by listening. The time during which each speech frame is sent as a specific packet is most suitably about 1 second. A great delay postpones the moment when the absent speech frame has to be replaced and thus improves speech comprehension. On the other hand, a great delay will deteriorate the efficiency of the system.

The invention produces a method with which the capacity of the packet network may be used as efficiently as possible. Network loading is at its peak only for a small portion of time. According to one preferred embodiment of the invention, each speech frame is transmitted in a specific packet if one or several of the following conditions are valid:

a subscriber has a high or the highest quality of service (QoS) specified in the packet network;

the network has unused capacity, such as at night time;

the quality of service is poor in some other part of the network and this is compensated by improving service elsewhere;

the length of the packet payload corresponds essentially to the length of the speech frame or is only about 20% longer than it.

The invention has been explained by way of example in a case where speech frames of the GSM system are transmitted in the ATM network. It will be evident to those skilled in the art that the same technique may also be used for transmitting music and video signals. In this case, a device which forms of the signal samples of a specified length is used in place of an encoder and a decoder refers to a device which produces a signal corresponding to the original signal from the samples. The length of a cell in the ATM network is fixed. Alternatively, the packet network could be Internet in which the length of a packet is variable. Before samples are passed to the decoder, they can be conducted to any transfer device that processes speech frames, such as Voice Mail System VMS. The invention and its embodiments are therefore not restricted to the examples described above but they may vary within the scope of the claims.

What is claimed is:

1. A method for transmitting a speech, audio and/or video signal as packets of a packet network, the method comprising:

encoding the signal to be transmitted into a parameter group which is inserted in traffic frames;

inserting traffic frames and/or parts of traffic frames in a payload part of the packets and sending the packets to a destination;

forming the payload part of at least some of the packets from at least one partial traffic frame in addition to at least one whole or partial traffic frame; said whole or partial traffic frames being formed of the same signal, until the payload part of the packet will be substantially full;

separating the traffic frames from the payload of the received packet at the destination; and passing parameter groups of the traffic frames to a decoder for producing original speech, audio and/or video signal, respectively, wherein the received parameter groups are buffered at the destination and they are passed to the decoder at essentially equal intervals, and the passing of buffered parameter groups is synchronized on the basis of the received packets in such a manner that the parameter groups are passed to the decoder on average on a same frequency as the packets are received.

2. A method for transmitting a speech, audio and/or video signal as packets of a packet network, the method comprising:

encoding the signal to be transmitted into a parameter group which is inserted in traffic frames;

inserting traffic frames and/or parts of traffic frames in a payload part of the packets and sending the packets to a destination, forming the payload part of at least some of the packets from at least one partial traffic frame in addition to at least one whole or partial traffic frame; said whole or partial traffic frames being formed of the same signal, until the payload part of the packet will be substantially full;

separating the traffic frames from the payload of the received packet at the destination; and passing a parameter groups of the traffic frames to a decoder for producing original speech, audio and/or video signal, respectively, wherein at the beginning of the connection and after pauses in the signal to be sent, for a period of 0.5 to 2 seconds, each traffic frame is conveyed in a specific packet, whereby the ending of a pause will be transmitted to the receiver as fast as possible.

3. A method according to claim 1, wherein the length of a packet in the packet network is fixed.

4. A method according to claim 3, wherein the packet network is an ATM network and the packet is an ATM cell.

5. A method for transmitting a speech, audio and/or video signal as packets of a packet network, the method comprising:

encoding the signal to be transmitted into a parameter group which is inserted in traffic frames;

inserting traffic frames and/or parts of traffic frames in a payload part of the packets and sending the packets to a destination;

forming the payload part of at least some of the packets from at least one partial traffic frame in addition to at least one whole or partial traffic frame; said whole or partial traffic frames being formed of the same signal, until the payload part of the packet will be substantially full;

separating the traffic frames from the payload of the received packet at the destination; and passing parameter groups of the traffic frames to a decoder for producing original speech, audio and/or video signal, respectively, wherein
the payload part of the packet is formed of at least two whole traffic frames whose combined length is at most a predetermined threshold value.

6. A method according for transmitting a speech, audio and/or video signal as packets of a packet network, the method comprising:

encoding the signal to be transmitted into a parameter group which is inserted in traffic frames;

inserting traffic frames and/or parts of traffic frames in a payload part of the packets and sending the packets to a destination;

forming the payload part of at least some of the packets from at least one partial traffic frame in addition to at least one whole or partial traffic frame; said whole or partial traffic frames being formed of the same signal, until the payload part of the packet will be substantially full;

separating the traffic frames from the payload of the received packet at the destination; and passing the parameter groups of the traffic frames to a decoder for producing original speech, audio and/or video signal, respectively, wherein
the packet network is an Internet network, the packet is an Internet packet and length of the payload part of packets is set to correspond to a multifold of the length of the traffic frame.

7. A method according to claim 6, wherein the length of a packet in the packet network is variable.

8. A method according to claim 1, wherein the traffic frames separated from the payload of the received packets at the destination are passed to the decoder via a memory means.

9. A method according to claim 1, wherein a base station links the address of the transcoder to the header of the packet and the transcoder the address of the base station, in which case a transmission link is provided between the base station and the transcoder.

10. A method according to claim 1, wherein a transmitting base station links the address of a receiving base station to the header of the packet, in which case a transmission link is provided directly between two base stations.

11. A method for transmitting a speech, audio and/or video signal as packets of a packet network, the method comprising:

encoding the signal to be transmitted into a parameter group which is inserted in traffic frames;

inserting traffic frames and/or parts of traffic frames in a payload part of the packets and sending the packets to a destination;

forming the payload part of at least some of the packets from at least one partial traffic frame in addition to at least one whole or partial traffic frame; said whole or partial traffic frames being formed of the same signal, until the payload part of the packet will be substantially full;

separating the traffic frames from the payload of the received packet at the destination; and passing parameter groups of the traffic frames to a decoder for producing original speech, audio and/or video signal, respectively, wherein
each speech frame is transmitted in a specific packet if one or several of the following conditions are valid:
a subscriber has a high or the highest quality of service;
the network has unused capacity;
the quality of service is poor in some other part of the network; and
the length of the payload of the packet corresponds essentially to a range from the length of the speech frame to about 20% longer than it.

12. A method according to claim 2, wherein the period is about one second.

13. A method according to claim 5, wherein the length of a packet in the packet network is fixed.

14. A method according to claim 5, wherein the predetermined threshold value is about 20% smaller than the length of the payload of the packet.

15. A method according to claim 8, wherein the memory means is a voice mail system.

* * * * *